United States Patent [19]

Kolditz

[11] Patent Number: 5,093,071
[45] Date of Patent: Mar. 3, 1992

[54] METHOD FOR AVOIDING POTENTIAL ACCIDENTS IN WATER-COOLED NUCLEAR REACTORS

[75] Inventor: Joachim Kolditz, Talheim, Fed. Rep. of Germany

[73] Assignee: Gemeinschaftskernkraftwerk Neckar GmbH, Neckarwestheim, Fed. Rep. of Germany

[21] Appl. No.: 407,475

[22] Filed: Sep. 14, 1989

[30] Foreign Application Priority Data

Sep. 17, 1988 [DE] Fed. Rep. of Germany ....... 3831711
Aug. 24, 1989 [DE] Fed. Rep. of Germany ....... 3927958

[51] Int. Cl.⁵ .................................................. G21C 9/00
[52] U.S. Cl. .................................... 376/283; 376/300; 376/309; 376/324
[58] Field of Search .............. 376/317, 323, 324, 300, 376/301, 310, 309, 277, 282, 283; 423/580

[56] References Cited

U.S. PATENT DOCUMENTS

| 3,307,913 | 3/1967 | Chave | 376/300 |
| 3,362,883 | 1/1968 | Wright | 376/300 |
| 4,139,603 | 2/1979 | Weems et al. | 376/300 |

FOREIGN PATENT DOCUMENTS

| 0019907 | 5/1984 | European Pat. Off. | |
| 2922717 | 11/1980 | Fed. Rep. of Germany | |
| 3017585 | 11/1981 | Fed. Rep. of Germany | 376/301 |

*Primary Examiner*—Daniel D. Wasil
*Attorney, Agent, or Firm*—Foley & Lardner

[57] ABSTRACT

Method and apparatus for avoiding potential accidents in water-cooled nuclear reactors of the type having an enclosing containment, due to the formation of an explosive gas mixture in the containment. Air is withdrawn from the containment and fed to at least one internal combustion engine as combustion air for the engine. The exhaust gases created by the internal combustion engine are then recycled back into the containment. The result is the lowering of the oxygen partial pressure in the containment to below the critical limit for oxyhydrogen explosion.

19 Claims, 2 Drawing Sheets

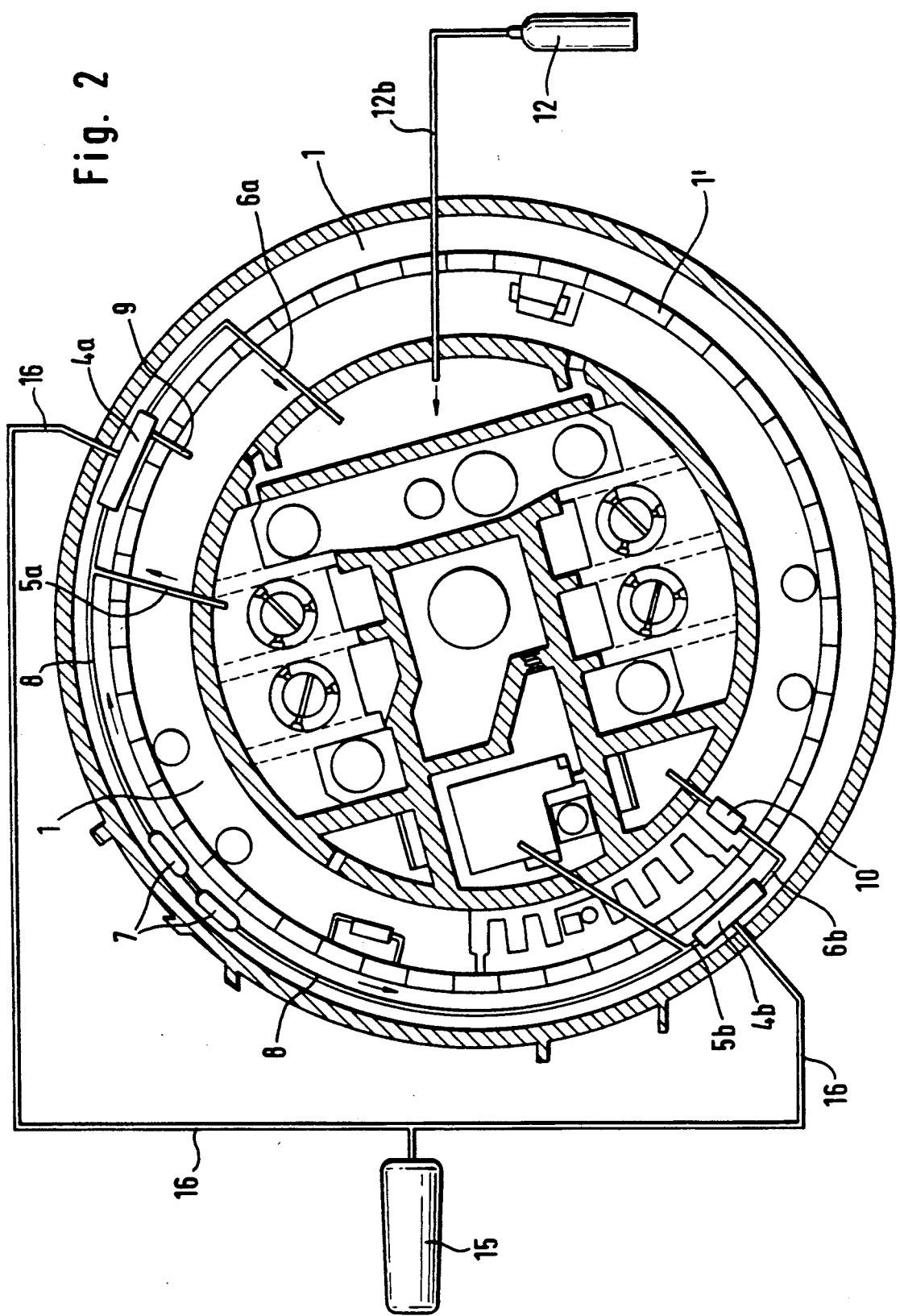

METHOD FOR AVOIDING POTENTIAL ACCIDENTS IN WATER-COOLED NUCLEAR REACTORS

BACKGROUND OF THE INVENTION

The invention relates to a method and apparatus for avoiding potential accidents in water-cooled nuclear reactors.

In the case of coolant loss reactor accidents, relatively large quantities of hydrogen are liberated by radiolytic decomposition of the water and by metal-water reactions. After the start of emergency cooling, hydrogen is only produced by radiolysis. This process proceeds relatively slowly, with the result that the hydrogen concentration in a pressurized water reactor can only reach the dangerous explosion limit of 4 vol % after prolonged periods.

Various methods have already been disclosed to prevent hydrogen and air forming an explosive mixture in the dangerous concentration limits of 4 vol % to 75 vol %, said methods supposedly preventing uncontrolled hydrogen combustion Thus, boiling water reactors, in which the lower $H_2$ explosion limit is reached after a significantly shorter time than in the case of pressurized water reactors in the event of coolant loss, are equipped with nitrogen inerting systems. Using these systems, the air present in the containment is replaced by nitrogen to such an extent that the residual oxygen concentration is below the limiting value at which a hydrogen/oxygen explosion (oxyhydrogen explosion) is possible. However, the inerting makes normal reactor operation more complicated.

Another possibility for avoiding an explosive mixture in a reactor containment has been disclosed in U.S. Pat. No. 4,139,603. In this disclosure, a recombination facility in a reactor containment for combining hydrogen and oxygen to form water is described. The essential element of the recombination facility is a bundle of electrically heated rods by means of which the gases flowing therethrough are heated to at least about 620° C. The disadvantage of this facility is to be seen in the fact that a supply of electrical energy has to be ensured in all cases.

German Offenlegungsschrift 2,922,717 (corresponds to EP-B1 0 019 907) describes a method for the recombination of hydrogen enclosed in the containment vessel of a nuclear reactor installation, utilizing a powder which reduces the hydrogen being introduced into the containment vessel using an inert gas. A catalyst which is known per se is used as the powder, with the catalyst powder together with the inert gas being blown predominantly into the upper region of the containment vessel from a storage tank arranged outside the containment vessel.

In addition to the uncertainty of the effectiveness of this catalyst in a reactor atmosphere following an accident, the settling of the fine catalyst powder blown in ($Al_2O_3$ powder with a particle size of 20 to 60 μm) in the entire containment must be regarded as a disadvantage.

In catalytic recombination, the originally present oxygen concentration of the containment air is not reduced since the radiolytically produced hydrogen only combines with the corresponding amount of radiolytically liberated oxygen.

The introduction of an easily reducible metal oxide powder for recombining the hydrogen is also known. In this case, however, not even the radiolytically liberated oxygen is recombined. The oxygen partial pressure is further increased by the radiolysis. In addition, the settling of the fine powder particles in the entire interior region of the containment is considered disadvantageous here as well.

Dangerous hydrogen concentrations in part regions of the containment can be prevented by thorough mixing of the containment atmosphere, e.g. by means of blowers and air circulation systems. However, this does not result in inerting.

The known methods aim almost exclusively to reduce the hydrogen concentration. Although, in the catalytic recombination methods, some of the oxygen is also bound, the oxygen partial pressure, during the reaction with radiolytically liberated hydrogen, does not fall below the partial pressure originally present in the containment air.

In the case of the inerting of boiling water reactors, this is achieved by a so-called preinerting. In preinerting, the containment is flushed and filled with nitrogen upon starting or restarting the plant until the $O_2$ concentration has fallen to the specified $O_2$ concentration.

SUMMARY OF THE PRESENT INVENTION

The object on which the invention is based is to keep the oxygen concentration in a nuclear reactor containment following a coolant loss accident so low, even in local areas of the containment, that an oxyhydrogen explosion is avoided with certainty.

By reason of the fact that, according to the method according to the invention, the oxygen concentration is reduced to below a certain critical limit, a hydrogen-oxygen oxyhydrogen explosion is reliably excluded. The reduction of the oxygen concentration in the reactor containment following an accident is accomplished by combustion processes in internal combustion engines, the air being removed from the containment atmosphere or from one or more subcompartments of the latter and the exhaust gas of the internal combustion engine being blown back into the containment or the subcompartments thereof.

Known fuels can be used as fuels for operating the internal combustion engines, with the customary liquid or gaseous fuels, such as, for example, gasoline, diesel oil, alcohol, hydrazide, hydrogen gas, propane etc. preferably being used.

The fuel can be stored or held ready both inside and outside the containment. Preferably, the fuel is held ready outside the reactor containment, from where it is piped to the internal combustion engine or engines. Accordingly, the feed pipe system, appropriately dimensioned and designed for safety, is to be installed from the fuel take-off point to the internal combustion engine. For reasons of redundancy and process engineering, it may be advantageous here to employ a plurality of internal combustion engines. If, therefore, in the text which follows only one internal combustion engine is mentioned, this is always intended to include also the use of a plurality of internal combustion engines.

The internal combustion engine is preferably set up inside the containment since this guarantees that no possibly radioactive air can escape into the environment of the nuclear reactor. However, it is quite possible to arrange the internal combustion engines outside the containment. In this arrangement, suitable measures must be taken to ensure that no radioactive containment air reaches the outside, this being accomplished, for example, by recycling the crankcase ventilator into the containment.

As internal combustion engines, it is possible to use both reciprocating piston engines and rotary piston engines, jet engines or the like. The decisive point is that the combustion process takes place in confined, rigid housings at elevated pressure. A so-called steam generator can also be used, operated with liquid hydrogen and oxygen on the principle of a jet engine. The internal combustion engines can be operated with or without a catalyst.

If the setting of the engine remains the same, the fuel/air mixture becomes increasingly enriched due to the closed circuit of the containment air via the combustion chamber of the engine since a fuel excess establishes itself and the air sucked in from the containment becomes increasingly oxygen-depleted.

In order to ensure that even separate zones, i.e. local areas of the containment air if required, are burnt as rapidly as possible by means of the method according to the invention for the purpose of reducing the proportion of oxygen, it is particularly advantageous if the intake branches to the internal combustion engines and/or the exhaust gas branches open into different regions of the containment.

The operation of, for example, an Otto engine is not only tied to the air ratio $\lambda = 1$ determined by the combustion equations. It operates within the ignition range both in the rich mixture (fuel excess) and with a lean mixture (air excess). For gasoline, the lower ignition limit is about 1.4 and the upper limit is about 8 vol % of vapor (Dubbel, 12th edition, volume 2, page 173).

In the case of explosive mixtures, the explosion range is broadened by increasing the initial pressure, in particular, the upper explosion limit is shifted to higher values. The explosion range is likewise broadened with increasing temperature, i.e. the higher the temperature of the mixture at ignition, the easier it is for the initiated reaction to propagate (see article by W. Bartknecht entitled "Explosions, Progress and Protective Measures", Springer-Verlag 1980, pages 6 and 7).

As a consequence of the circulation according to the invention of the containment air by the internal combustion engine and of the concomitant decrease in the oxygen concentration of this air sucked in by the internal combustion engine, it may occur that the fuel-air mixture in the internal combustion engine falls below the explosion limit and the internal combustion engine no longer has the ability to function.

In order to maintain the functioning ability of the internal combustion engine in all cases, provision is made according to the invention to feed oxygen in an appropriate quantity to the engine intake branch from outside the reactor containment, in addition to the containment air. Mixture control can here be accomplished, for example, by means of the lambda probe. See in this regard the article by C. Reuber entitled "25 Years of Analytical Sensors", *Elektronik Journal*, August 1988, page 16.

In this way, the full capacity of the internal combustion engines employed is maintained, enabling these to be used, in a further development of the invention, as additional drive units in the case of accidents, for example, for appropriate machines, such as pumps, blowers for air circulation, etc.

The pump(s) driven by the internal combustion engine can be used, for example, for the borated water supply to the reactor cooling system and/or for afterheat removal. Pumps driven in this way can also be used for the supply of water to a spray system which is employed for pressure relief in the reactor cooling circuit and the containment vessel.

During the combustion of fuels containing hydrogen such as, for example, gasoline, diesel oil, alcohols and hydrogen gas and other gaseous fuels—steam is produced.

$$2 H_2 + O_2 = 2 H_2O \text{ (condensable)}.$$

By virtue of the condensation of the steam, the pressure in the containment is reduced and the feeding in of an inert gas, such as, for example, nitrogen, would be necessary for pressure compensation.

During the combustion of carbon and of hydrazide with the oxygen of the containment air, the number of moles of the uncondensable gases does not change:

$$C + O_2 = CO_2$$

and $N_2H_4 + O_2 = N_2 + 2 H_O$ (condensable).

The additional supply of oxygen envisaged according to the invention, in order as described to maintain the operation of the internal combustion engine, would, with the additionally required or consumed carbon-containing fuel or hydrazide, cause a pressure build up. However, in the case of fuels containing hydrocarbons, this would remain below 0.06 bar, in particular if a residual oxygen content in the reactor containment were permitted. According to K. Nabert and G. Schon in the publication entitled "Safety-Related Characteristics of Combustible Gases and Vapors", second edition, Deutscher Eichverlag GmbH, Berlin, Federal Republic of Germany, $c_{max}O_2$ - value of hydrogen is as follows:
in $CO_2 = 5.9$ vol % and
in $N_2 = 5.0$ vol %, wherein
$c_{max}O_2$ is the maximum concentration of the oxygen content of the air in vol %, relative to the overall mixture of fuel plus air plus inert gas, and is the concentration which the oxygen of the air in the overall mixture must not exceed in order, given an unknown concentration of the fuel and of the respective inert gas, to still just prevent an explosion.
In other words, with a residual oxygen concentration below 5 vol % in the containment atmosphere, an explosion would be reliably avoided.

By closing individual subcompartments of the containment and drawing off the air in these, and by blowing the exhaust gases back into these subcompartments, a partial inerting can also be achieved. It is also possible to combine the method according to the invention with the inerting known per se, for example, by reducing the oxygen concentration in some subcompartments of the containment and carrying out the known inerting, for example, with recombiners, in other subcompartments of the containment, for example, those which are designed as separate chambers. For this purpose, inert gas such as helium or nitrogen can be blown in.

Further features of the invention will be apparent from the following description and drawings, in which exemplary embodiments described below of a facility

BRIEF DESCRIPTION OF THE DRAWINGS

FIG. 2 is a schematic horizontal section through the containment with internal combustion engines arranged outside the containment.

DETAILED DESCRIPTION OF THE PREFERRED EMBODIMENTS

Figure 1:
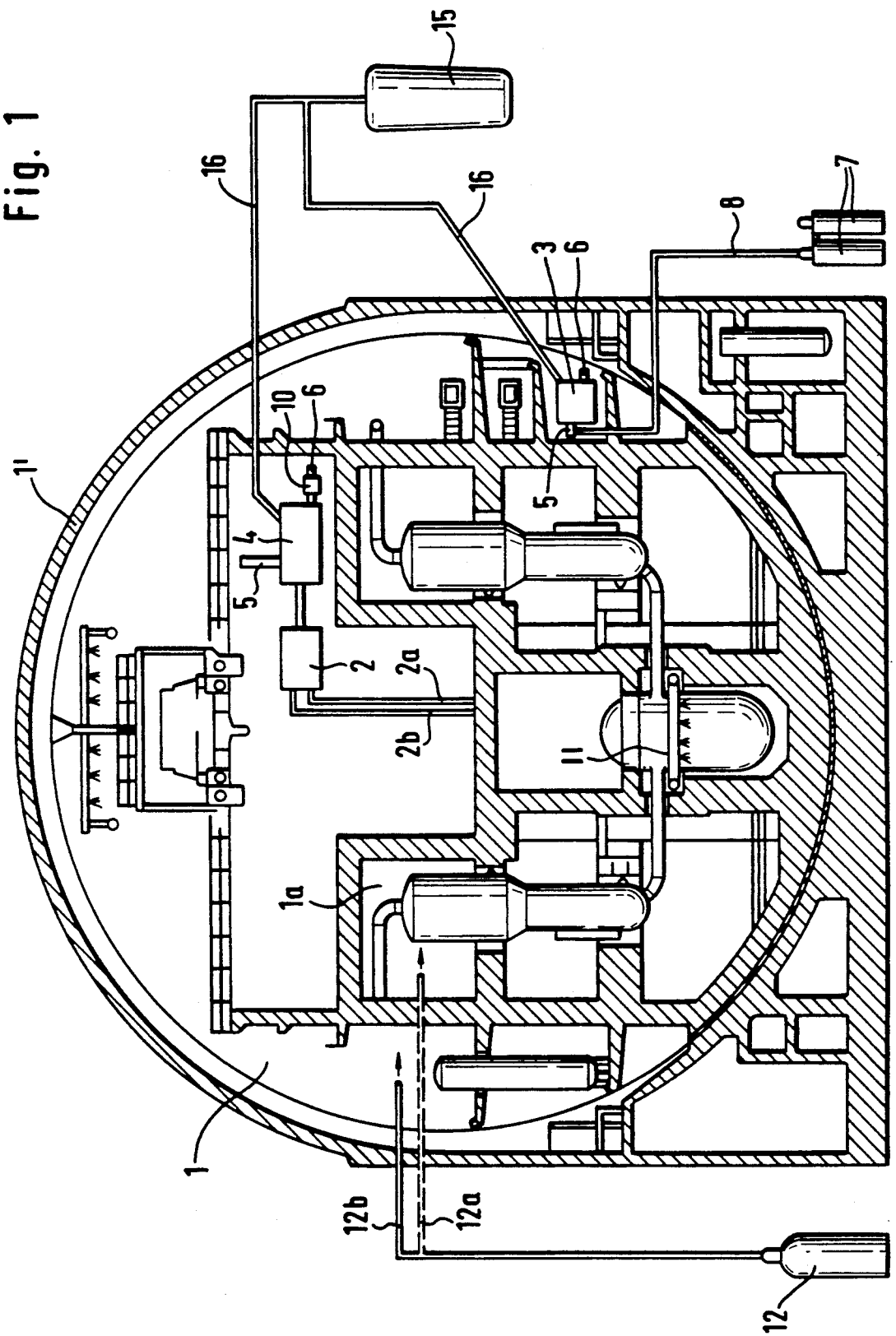
FIG. 1 is a schematic vertical section through the containment with internal combustion engines arranged in the containment.

The illustrated containment 1 of a nuclear reactor is surrounded by a steel containment shell 1'. In the containment are arranged the reactor and the steam generators, heat exchangers, etc. which are subjected to radioactivity. If a loss of cooling water accident occurs a large quantity of hydrogen is liberated by radiolytic decomposition of the water, there being the risk at 4 vol. % and above of an oxyhydrogen gas explosion and hence the risk of damage to the containment itself. In order to prevent the formation of oxyhydrogen gas, two internal combustion engines 3 and 4, for example, are arranged in the containment. Via their intake branches 5, these internal combustion engines suck in the air from the containment, which, following combustion in the internal combustion engine, emerges into the containment again via the exhaust gas branch 6. Internal combustion engines eligible for consideration are those which are suitable for mixed operation ($H_2$/ liquid or gaseous fuel), for example, reciprocating piston engines, rotary piston engines, jet engines, steam generators, or the like, in which the combustion process takes place in confined, rigid housings, namely the engine housings of these internal combustion engines, at elevated pressure. As fuels, it is also possible to use gasoline, diesel oil, alcohol, hydrazide, gaseous fuels or the like.

In the arrangement shown schematically in FIG. 2, the internal combustion engines 4a, 4b are situated outside the containment 1, according to the exemplary embodiment, between the outer steel containment shell 1' and the containment 1. The intake branches 5a, 5b and the exhaust gas branches 6a, 6b are passed gastightly through the containment. The internal combustion engines 4a, 4b are provided with protection devices against the escape of radioactive containment air. These can comprise, for example, a crankcase ventilation 9 (internal combustion engine 4a) which opens gastightly into the containment 1. Fuel is fed to the individual internal combustion engines via pipes 16 which are connected to a fuel tank 15.

The internal combustion engine 3 according to FIG. 1 is arranged in a subcompartment of the containment 1 in such a way that its intake branch 5 and its exhaust gas branch 6 are likewise situated in this subcompartment. It can be advantageous to have the branches 5 and 6 open into other subcompartments and/or to provide a plurality of intake and exhaust gas branches, each opening into different subcompartments.

If a plurality of internal combustion engines from the containment 1 and/or from subcompartments of the containment can be drawn off via separate intake and exhaust gas branches 5a, 5b, 6a, 6b, with the exhaust gases similarly being piped into subcompartments of the containment. By virtue of the fact that the intake branches and/or exhaust gas branches open into different subcompartments of the containment 1, the oxygen partial pressure prevailing in these local areas of the containment is lowered rapidly and uniformly by combustion of the air present in this area. The formation of oxyhydrogen gas is thereby counteracted.

To reduce the pollutants introduced into the containment 1 with the exhaust gases, it is advantageous to arrange a catalyst 10 in the exhaust gas branches 6, 6b of the internal combustion engines 4, 4b.

In order to continue to ensure complete combustion in the internal combustion engine as the oxygen partial pressure falls, provision is furthermore made for the feed of extraneous air to the intake branches 5, 5a, 5b on the intake side of the internal combustion engines 3, 4a, 4b, this being possible in the exemplary embodiments shown via pipes 8. The pipes 8 are advantageously connected to oxygen cylinders 7, enabling pure oxygen to be admixed.

It is also possible, in addition to the provision according to the invention of internal combustion engines, for another recombiner to be introduced for inerting, for example, other subcompartments 1a of the containment 1. The blowing in of an inert gas, such as helium or nitrogen, is advantageous, said gas being fed in via the pipe 12a from a gas cylinder 12.

The feeding of an inert gas into the containment or into subcompartments of the containment into which the intake branches 5, 5a, 5b of the internal combustion engines 3, 4, 4a, 4b open is also advantageous for compensating a vacuum produced. Thus, for example, an inert gas, such as for example nitrogen or helium, is blown in from a gas cylinder 12 via the pipe 12b in order to achieve a pressure compensation.

In an advantageous further development of the method and apparatus according to the invention, the internal combustion engine(s), engine 4 shown in FIG. 1, drives a pump 2 or a set of pumps. Since the internal combustion engines are put into operation in the case of an accident, and by virtue of the feeding in of oxygen, can run trouble free in any operating situation, motive energy is available which can be used for controlling the accident. The intake line 2a of the pump 2 thus driven, or its delivery line 2b, is connected to the reactor cooling system, thus ensuring, for example, the borated water supply to the cooling system. The pump 2 can also be used to ensure the removal of afterheat.

The pump 2 is advantageously used for supplying water to a spray system 11 (FIG. 1). The spray system 11 is inserted in the containment vessel of the reactor for the purpose of pressure relief in the case of an accident. The use of the spray system 11 for cooling the reactor pressure vessel is also appropriate.

What is claimed is:

1. A method for avoiding potential accidents in water-cooled nuclear rectors of the type having an enclosing containment, due to the formation of an explosive gas mixture in the containment, comprising the steps of:

a) withdrawing air from the containment and feeding air to at least one internal combustion engine as combustion air for the engine, said at least one internal combustion engine being used to drive a pump adapted to be used for water supply to the reactor cooling system or for afterheat removal therefrom, and b) recycling the exhaust gases created by the internal combustion engine back into said containment, whereby the oxygen partial pressure in the containment is lowered below the critical limit for oxyhydrogen explosion.

2. The method as claimed in claim 1, wherein said at least one internal combustion engine is operated using know fuels selected from the group consisting of gasoline, diesel oil, alcohol, hydrazide, hydrogen gas, and propane.

3. The method as claimed in claim 1, further including the step of adding oxygen to the containment air supplied to said engine for combustion.

4. The method as claimed in claim 1, further including the step of feeding inert gas to said containment to compensate for the vacuum produced by withdrawal of combustible air.

5. The method of claim 4, wherein said inert gas is nitrogen.

6. The method as claimed in claim 1, wherein said containment is comprised of at least one internal subcompartment, combustible air being drawn off from said at least one subcompartment and exhaust gas recycled back thereto.

7. The method as claimed in claim 6, wherein said containment includes other subcompartments, and further including the step of feeding inert gas into said other subcompartments.

8. The method of claim 7, wherein said inert gas is selected from the group consisting of helium and recombiners.

9. The method of claim 1, wherein two internal combustion engines are utilized.

10. A method for avoiding potential accidents in water-cooled nuclear reactors of the type having an enclosing containment, due to the formation of an explosive gas mixture in the containment, comprising the steps of:
    a) withdrawing air from the containment and feeding the air to at least one internal combustion engine as combustion air for the engine, said at least one internal combustion engine being used to drive a pump for supplying water to a spray system for pressure relief in the reactor cooling circuit and/or in the containment vessel, and
    b) recycling the exhaust gases created by the internal combustion engine back into said containment, whereby the oxygen partial pressure in the containment is lowered below the critical limit for oxyhydrogen explosion.

11. The method as claimed in claim 10, wherein said at least one internal combustion engine is operated using known fuels selected from the group consisting of gasoline, diesel oil, alcohol, hydrazide, hydrogen gas, and propane.

12. The method as claimed in claim 10, further including the step of adding oxygen to the containment air supplied to said engine for combustion.

13. The method as claimed in claim 10, further including the step of feeding inert gas to said containment to compensate for the reduced pressure produced by withdrawal of combustible air.

14. The method of claim 13, wherein said inert gas is nitrogen.

15. The method as claimed in claim 10, wherein said containment is comprised of at least one internal subcompartment, combustible air being drawn off from said at least one subcompartment and exhaust gas recycled back thereto.

16. The method as claimed in claim 15, wherein said containment includes other subcomponents, and further including the step of feeding inert gas into said other subcompartments.

17. The method of claim 16, wherein said inert gas is selected from the group consisting of helium and recombiners.

18. The method as claimed in claim 10, wherein said pump is adapted to be used for water supply to the reactor cooling system or for afterheat removal therefrom.

19. The method of claim 10, wherein two internal combustion engines are utilized.

* * * * *